United States Patent [19]
Wolf et al.

[11] Patent Number: 5,595,239
[45] Date of Patent: Jan. 21, 1997

[54] HEATING, VENTING, AND/OR AIR CONDITIONING UNIT

[75] Inventors: Hannes Wolf, Buchen; Alfred Kern, Schneeberg, both of Germany

[73] Assignee: Aurora Konrad G. Schulz GmbH & Co., Odenwald, Germany

[21] Appl. No.: 284,355

[22] Filed: Aug. 1, 1994

[30] Foreign Application Priority Data

Nov. 29, 1993 [DE] Germany .................. 43 40 587.8

[51] Int. Cl.⁶ .................................................. F28F 13/00
[52] U.S. Cl. ............................ 165/41; 264/545; 264/248
[58] Field of Search .......................... 165/41; 264/545, 264/248

[56] References Cited

U.S. PATENT DOCUMENTS

| | | |
|---|---|---|
| 4,592,207 | 6/1986 | Rummel . |
| 5,263,893 | 11/1993 | Hoffman et al. . |
| 5,391,251 | 2/1995 | Shuert ......................... 264/545 |
| 5,399,215 | 3/1995 | Blot et al. ..................... 264/545 |
| 5,427,732 | 6/1995 | Shuert ......................... 264/545 |

FOREIGN PATENT DOCUMENTS

| | | |
|---|---|---|
| 2841277 | 4/1980 | Germany . |
| 1335633 | 10/1973 | United Kingdom . |
| 1599043 | 9/1981 | United Kingdom ............. 264/545 |

OTHER PUBLICATIONS

"Thermoforming – A Plastics Processing Guide", by G. Gruenwald, Technomic Publishing Co., Jun. 1987.

*Primary Examiner*—Edward K. Look
*Assistant Examiner*—Mark Sgantzos
*Attorney, Agent, or Firm*—Robert W. Becker & Associates

[57] ABSTRACT

A heating-venting-air conditioning unit for a cabin vehicle is positioned at the roof of the cabin vehicle. The unit has at least one blower having air channels connected to a suction side and a pressure side of the blower. At least one of the air channels is connected to the suction side to form a suction channel and at least one of the air channels is connected to the blower side to form an air distributing channel. At least one of the suction channel and the air distributing channel is comprised of two half-shells manufactured by a double deep-drawing process.

23 Claims, 4 Drawing Sheets

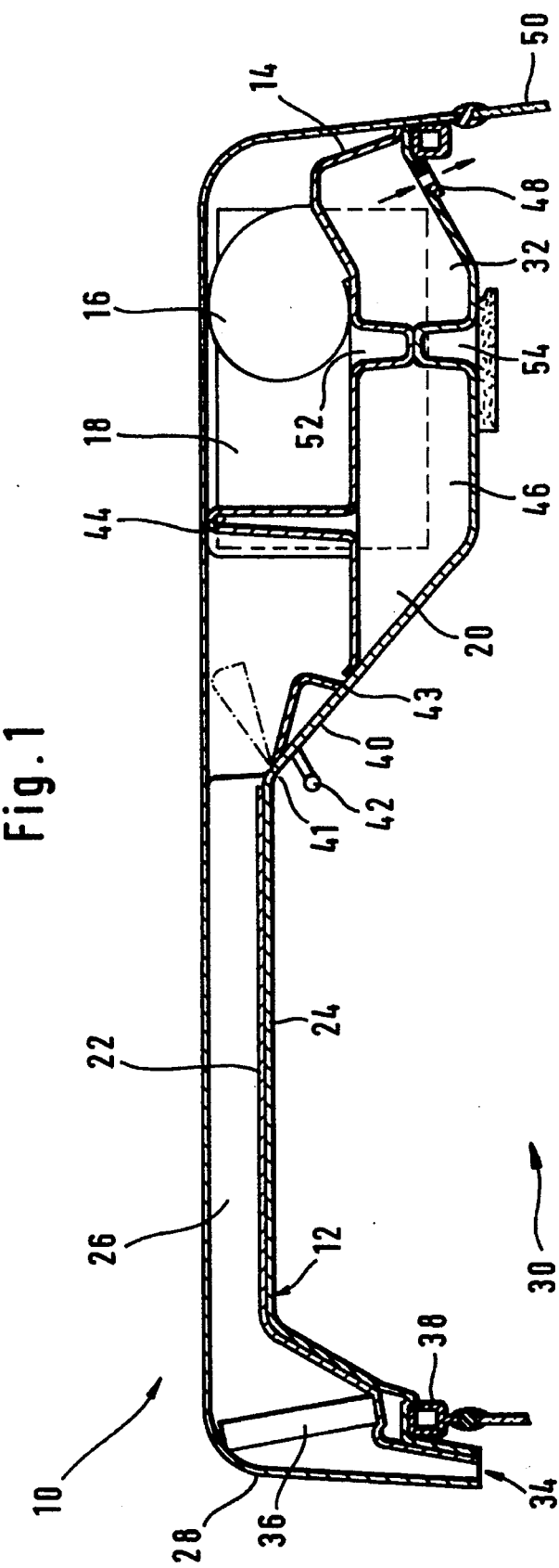

HEATING, VENTING, AND/OR AIR CONDITIONING UNIT

BACKGROUND OF THE INVENTION

The present invention relates to a heating, venting, and/or air conditioning unit for vehicles, especially a unit arranged at the roof of a cabin vehicle, having at least one blower and air channels which are connected to the suction side (suction channels) and/or pressure side (air distributing channels) of the blower.

Such heating, venting, and/or air conditioning units are, for example, known from German Offenlegungsschrift 28 41 277. It is a well-known problem of cabin roof heaters that while space is saved within the floor space of the usually cramped cabin and unused free space at the roof of the cabin is used instead, the vehicle is, however, made top-heavy and the roof construction must be reinforced resulting in constructive disadvantages.

A special problem with the use of so-called double radii blowers for a roof heater is that special measures must be taken in order to prevent resonances within the support structure of the blower. Resonance oscillations result in considerable loads on the fastening elements, have negative effects on the long term service life, and increase considerably the noise development resulting from the roof heater. In order to prevent resonances with roof heaters a conventional measure in the past has been to eliminate large volume pressure distributing chambers even when enough space is available at the roof and to provide support plates of a considerable thickness.

However, the lack of a pressure distributing chamber downstream of the blower results in non-uniform flow conditions and requires special measures especially in order to supply air, in addition to the air supplied to the windshield, to other windows especially the rear window, in order to defrost it. A pressure nozzle which makes a pressure distributing chamber downstream of the blower obsolete is suggested in German Offenlegungsschrift 28 41 277.

It is an object of the present invention to provide a heating, venting, and/or air conditioning unit of the aforementioned kind which despite a comparatively small weight of the support structure allows for a resonance-free support of the blower whereby at the same time a cost-effective manufacture should be possible.

SUMMARY OF THE INVENTION

A heating-venting-air conditioning unit for a cabin vehicle positioned at the roof of the cabin vehicle according to the present invention is primarily characterized by:

At least one blower having air channels connected to a suction side and a pressure side of the blower, with at least one of the air channels connected to the suction side to form a suction channel and with at least one of the air channels connected to the blower side to form an air distributing channel; and wherein At least one of the suction channel and the air distributing channel is comprised of two half-shells manufactured by a double deep drawing process.

Advantageously, the unit further comprises a support structure for supporting the blower, the support structure comprised of two half-shells manufactured by a double deep drawing process.

Preferably, the unit further comprises at least one auxiliary device supported on the support structure. The auxiliary device is a heat exchanger and/or an evaporative unit.

Preferably, the unit is comprised of two deep-drawn foils connectable by fusing, wherein the two foils have spaced-apart portions, with the space-apart portions being fused laterally and forming the air channels. Preferably, the foils are made of plastic.

Advantageously, the spaced-apart portions extend substantially horizontally and a material thickness of portions of the unit having a vertical component are reducible by deep-drawing.

In a preferred embodiment of the invention, an upper one of the two foils forms the support structure and separates the at least one suction channel and the at least one air distributing channel.

Preferably, the air channels comprise a pressure distributing chamber connected to the pressure side of the blower, the pressure distributing chamber having supports formed by projections of the two foils projecting toward and abutting at one another.

Preferably, the two foils are upwardly drawn within an area of the cabin vehicle where the head of a driver is located to form a substantially horizontal double wall.

In a preferred embodiment of the present invention, between the upper one of the two foils and a roof envelope of the cabin vehicle a suction channel is provided and the upper one of the two foils is spaced from the roof envelope.

Preferably, the unit further comprises supply lines for the blower and the at least one auxiliary device, wherein the supply lines are guided through roof supporting columns of the cabin vehicle. Preferably, one of the roof-supporting columns is connected with an upper end thereof to one of the air channels such that air is guided to the floor space of the cabin vehicle.

Advantageously, the lower one of the two foils is provided with a damping material. The damping material is a soft foamed material.

Expediently, the support structure has means for receiving operating elements for controlling heating, air conditioning, and vehicle-own devices.

Preferably, the unit further comprises a filter with a housing, wherein the housing of the filter covers the suction channel and is glued to the support structure.

In a preferred embodiment of the present invention the unit comprises a support structure, wherein at least some of the air channels are arranged within the support structure, the support structure is comprised of a portion of a unishell construction and a portion comprised of two half-shells, wherein the portion of a unishell construction has a wall thickness twice as thick as the wall thickness of the portion comprised of two half-shells.

In another embodiment of the present invention the unit further comprises air inlets and vents, wherein the at least one of the suction channels and the air distributing channels comprised of two half-shells and manufactured by a double deep-drawing process forms a chamber delimited by the blower and the inlets and/or the vents.

Preferably, the unit comprises markings for stamp-outs provided on the device by deep-drawing.

Preferably, the unit further comprises a preset breaking point for forming a flap serving to switch between air intake and air circulation within the unit. Preferably, the flap comprising a film joint to allow pivoting of the flap.

Advantageously, the unit further comprises a flap with a film joint, the flap serving to switch between air intake and air circulation within the unit.

According to the present invention, the support structure that receives the blower, the heat exchanger and optionally the evaporative unit and which is designed for providing the air channels, is in the form of a deep-drawn part. In an especially suitable manner for manufacturing the support structure two foils or plates that can be fused to one another are formed by a double deep-drawing technique whereby the plates or foils are deep-drawn in one working step and are simultaneously fused together to form the deep-drawn part. In this manner contacting areas and spaced-apart areas are formed whereby in the spaced-apart areas air channels are provided. Surprisingly, with this technique, despite the material savings, resonances can be avoided or at least greatly reduced. The stiffness is greatly increased due to the two half-shell construction and the resonance frequency is greatly shifted such that no resonances are to be expected with conventional blowers.

It is understood that a further noise damping can be provided in the form of conventional linings with damping materials, for example, in the form of a soft foamed materials. Such a lining may serve simultaneously as an impact protective device at the lower plane of the support structure.

In an especially favorable manner the invention can be used in connection with a roof venting device known from tractor cabins or other cabin vehicles. Due to the weight reduction, resulting from the lighter support structure with an increased stiffness, the top-heaviness of the respective vehicle is reduced. The production costs are reduced with respect to the conventional technique of producing separate injection molded parts, which subsequently must be assembled and sealed relative to one another, due to the fact that the support structure is manufactured in one working step.

With the invention it is also possible to provide for a switching flap that switches between air intake and circulation which flap is integrated into the deep-drawn part. For this purpose, one side of the flap is thinned out by the deep-drawing process in the form of a film joint while the opposite side of the flap is in the form of a preset breaking point.

It is especially favorable that with the double deep-drawing technique for producing a half-shell construction it is also very easily possible to produce ribs for guiding air or for stiffening the structure. Due to the half-shell construction the closed appearance of the visible surface as well as the air guidance on the side of the support structure facing away from the rib is not impaired.

According to an advantageous embodiment it is suggested that the air distributing channels surround the roof-supporting column of the vehicle which column is open to the top. With such an embodiment it is possible in a simple manner to guide heating air to the floor space of the vehicle.

For further stiffening and reduction of resonance oscillations supports in the form of projections facing one another and abutting end to end can be provided between the two plates or foils that form the deep-drawn part within the pressure distributing chamber whereby simultaneously a stiffening of the support of the blower results.

It is favorable that additional functional components such as actuating elements for the blower control, air control etc. inclusive the required vents, are directly included within the deep-drawn part. Furthermore it is possible to provide at a suitable location loud speakers if this is desired.

According to another advantageous embodiment it is suggested to provide a support surface for an air filter adjacent to the suction opening on the deep-drawn part so that the filter extends between the deep drawn part and the roof envelope. It is understood that the filter, in a manner known per se, is provided at its upper end with rubber sealing lips.

BRIEF DESCRIPTION OF THE DRAWINGS

The object and advantages of the present invention will appear more clearly from the following specification in conjunction with the accompanying drawings, in which:

FIG. 1 shows a schematic view of a longitudinal section along the line I—I of FIGS. 3 and 4;

FIG. 2 shows a schematic view of the longitudinal section along the line II—II of FIG. 4;

DESCRIPTION OF PREFERRED EMBODIMENTS

Figure 3:
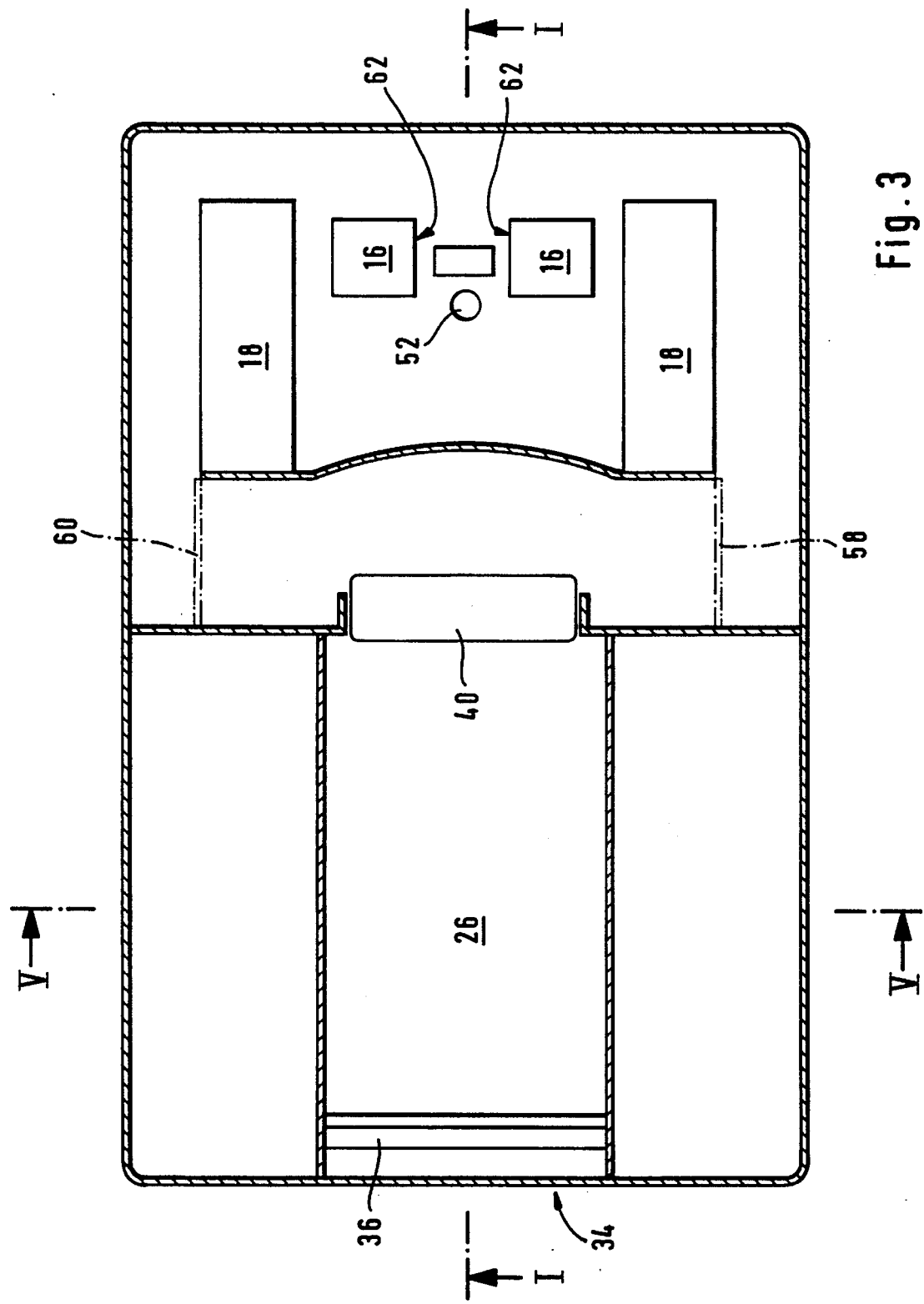
FIG. 3 shows a plan view of the support structure for the embodiment of an inventive heating, venting and/or air conditioning unit for vehicles, whereby the suction plane is represented.

The present invention will now be described in detail with the aid of several specific embodiments utilizing FIGS. 1 through 5.

The inventive heating, venting and/or air conditioning unit 10 for vehicles comprises a deep-drawn part 12 that forms a support structure 14 for blower 16 and a heat exchanger 18 of the unit 10. The deep-drawn part 12 is manufactured in a double deep-drawing technique and comprised of two half-shells forming air channels 20. The deep-drawn part is comprised of an upper foil or plate 22 and a lower foil or plate 24 whereby the foils 22 and 24 are partially fused together and partially spaced apart.

A suction channel 26 is formed between the upper foil 22 and a roof envelope 28 and extends from the area of the cabin 30 above the head of the driver to the forward end. At the pressure side of the blower 16 an air distributing channel 32 is provided which can be seen in detail in FIG. 4. Even areas in which the suction channel 26 is not present, the support structure 14 is spaced from the roof envelope 28, as can be seen for example, in FIG. 5. It is thus possible with this design to guide heated air through the unit 10 without risking cooling at the cold roof envelope 28.

Downstream of the air intake opening 34 a filter 36 is arranged within the suction channel 26 which in the represented embodiment is slightly inclined. The filter 36 is supported on the upper foil 22. The foil 22 at this location is spaced apart from the lower foil 24 and forms a cup for the filter in order to thereby facilitate its receiving and attaching by gluing thereto.

In contrast, the lower foil 24 provides a receiving element for an upper rear transverse beam 38 so that the entire support structure 14 is supported on this transverse beam.

At a location, which is suitably positioned within the visual field and within easy access of the driver, a switching flap 40 is provided at the deep-drawn part 12. The switching flap 40 extends substantially at a slant downwardly and opens the suction channel 26 during suction of fresh air as shown in FIG. 1 in the solid line representation. The deep-drawn part 12 is drawn at the upper end of the switching flap such that a much reduced wall thickness results. This location of much reduced wall thickness forms a film joint 41 for the switching flap 40. At the edges and at the lower side of the switching flap 40 the deep-drawn part 12 is also of a very thin wall thickness. This U-shaped area forms a preset breaking point 43 which, for example, can be slotted with a knife etc. so that the switching flap 40 allows for shutting off, in the upper position represented in a dash-dotted line in FIG. 1, the supply of fresh air via the suction channel 26 and to allow instead the supply of recirculating air.

It is understood that in a suitable manner a catch or securing device for the two possible positions must be provided as well as a grip 42.

The suction channel 26 ends at the forward end in a rather high rib 44 which extends to the roof envelope 28. At this location the upper foil 22 is spaced apart from the lower foil 24 in order to form a pressure distributing chamber 46 downstream of the blower 16. At this location, the air, as is shown in FIG. 3, is laterally outwardly guided so as to flow through the auxiliary device (heat exchanger 18).

After passing through the blower, 16 which is preferably a double radial blower, the air enters the pressure distributing chamber 46 which serves as a means for equalizing the flow. In the represented embodiment it is however possible that at the same time heated air with a high flow velocity can exit through a vent 48 for the purpose of defrosting the windshield 50 which is represented only partially. For this purpose, the vent 48 is arranged in an extension of the exit direction of the blower 16.

Figure 4:
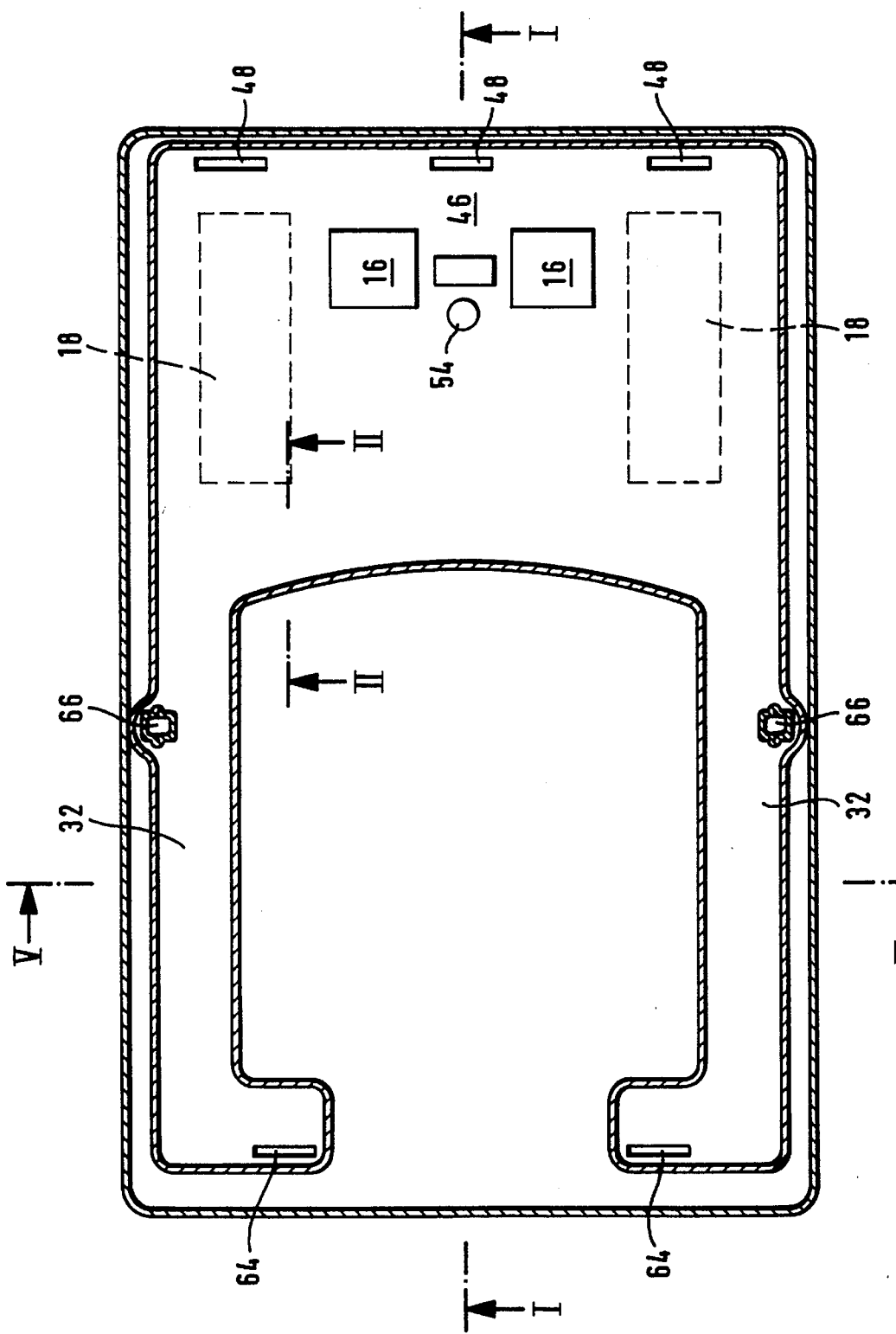
FIG. 4 shows a schematic representation of the pressure plane of the inventive embodiment of the heating, venting and/or air conditioning unit.

It is understood that a plurality of vents 48 can be arranged adjacent to one another, as shown in FIG. 4, for the purpose of defrosting the windshield 50 over its entire width.

In a modified embodiment vents are not provided in the form of parts to be inserted, but a further preset breaking point is formed within the deep-drawn part 12 so that a material strip can be easily removed in order to form a slot.

The air pressure distributing chamber 46 at the center has supports in the form of projections 52 and 54 facing one another and abutting end to end which are formed within the upper foil 22 and the lower foil 24 and which not only improve the support of the blower 16, but also prevent possible resonance oscillations.

In FIG. 2 a section along the line II—II of FIG. 4 is represented. Same reference numerals refer to same parts in the various drawings. The suction channel 26 is delimited by the rib 44 and a rib 56 both of which seal off the roof envelope 28. For forming the ribs 44 and 56 the two foils 22 and 24 of the support structure are drawn apart so that the lower foil 24 provides a closed surface.

Below the suction channel 26 an air distributing channel 32 extends laterally outwardly and upwardly and has a transition into the cross-section according to FIG. 5. The upper foil 22 at this location forms a separating plane between the suction and the pressure side.

The suction plane of the inventive device 10 is represented in FIG. 3. In this representation it can be seen that the suction channel 26 in the area behind the switching flap 40 is divided into a right and a left branch. Here the height, as can be seen in FIG. 2, is greater so that the reduced width in comparison to the area upstream of the switching flap 40 is compensated. The air is guided laterally into the heat exchanger 18 which in the shown embodiment extend transverse to the direction of travel. The air passes through the heat exchanger 18 from the exterior to the interior and is guided into the suction area of the blower 16.

In another embodiment it is suggested to have one of the heat exchangers as an evaporative device. For this purpose, two slides 58 and 60 schematically represented in FIG. 3 are provided. During air conditioning operation the slide 60 is closed and the slide 58 is open whereby the heat exchanger 18 coordinated with the slide 58 is an evaporative unit and provides cooling. Since above the blower 16 a comparatively large volume suction area is provided, a uniform temperature can be achieved. A further equilibration of the temperature is possible when suction openings 62 of the double radial blowers 16 are used that are facing the motor or when a single radial blower is used.

When a heating operation is desired, the slide 58 is closed and the slide 60 opened.

In FIG. 4 a schematic view of the pressure plane of the device 10 is represented. Downstream of the blower 16 a large volume air pressure distributing chamber 46 is provided which extends in the forward direction over the entire width of the vehicle and ends in the vents 48. To the rear, fork-shaped widened air distributing channels 32 are connected to the pressure chamber 46. These channels 32 extend to the rearward area of the cabin 30 and end in vents 64 for supplying the rear window with air.

The air distributing channels 32 overlap the roof supporting columns 66 of the cabin. They are opened at the top so that air can directly enter the columns. With this design a floor space venting of the vehicle is realized with simple means.

It is understood that in a manner known per se the supporting columns of the cabin, even if this is not represented in the drawings, are designed to contain supply lines for the evaporative unit, the heat exchanger, and the blower as well as for other auxiliary elements.

Figure 5:
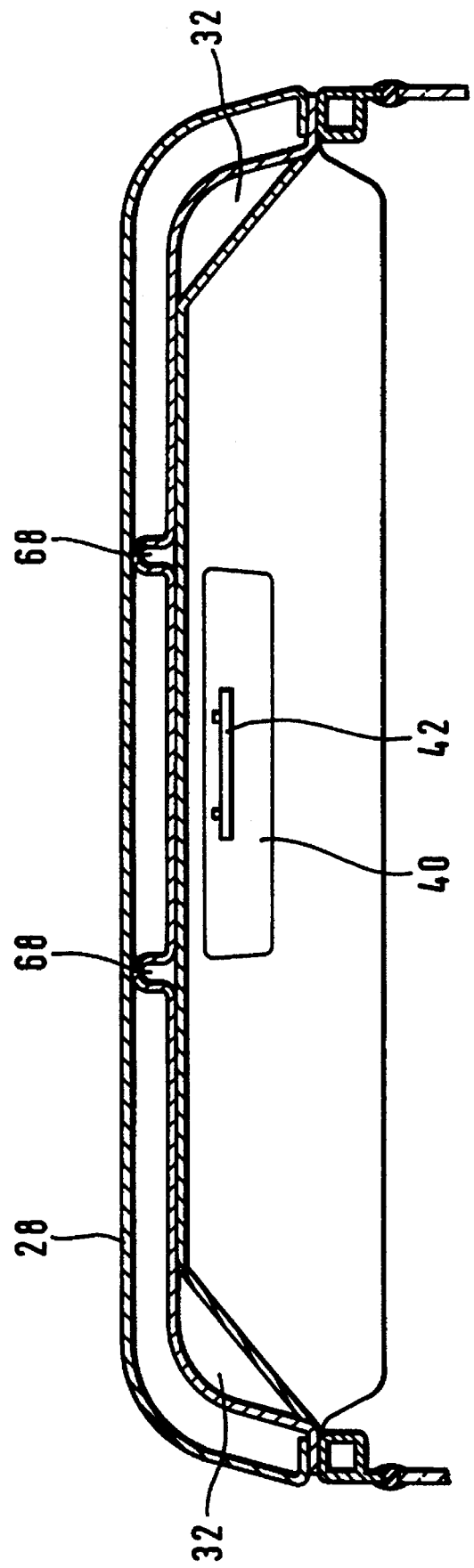
FIG. 5 shows a section along the line V—V of FIG. 4.

The representation according to FIG. 5 shows that the air distributing channels 32 extend at a slant outwardly but spaced from the roof envelope 28. In this embodiment the space above the head of a driver is not at all obstructed. For delimiting the suction channel 26 ribs 68 extend parallel to the longitudinal axis of the vehicle.

It is understood that numerous modifications are possible without deviating from the gist of the invention. For example, the air channels can be designed differently. It is also possible to position the suction channel between layers of the deep-drawn part. Optionally, a third layer for separating the two deep-drawn foils can be provided.

The present invention is, of course, in no way restricted to the specific disclosure of the specification and drawings, but also encompasses any modifications within the scope of the appended claims.

What we claim is:

1. A heating-venting-air conditioning unit for a cabin vehicle positioned at a roof of the cabin vehicle; said unit comprising:

at least one blower having air channels connected to a suction side and a pressure side of said blower, with at least one said air channel connected to said suction side to form a suction channel and with at least one said air channel connected to said blower side to form an air distributing channel; and wherein at least one of said suction channel and said air distributing channel is comprised of two half-shells manufactured by a double deep-drawing process.

2. A unit according to claim 1, further comprising a support structure for supporting said blower, said support structure comprised of two half-shells manufactured by a double deep-drawing process.

3. A unit according to claim 2, further comprising at least one auxiliary device supported on said support structure.

4. A unit according to claim 3, wherein said auxiliary device is a heat exchanger.

5. A unit according to claim 3, wherein said auxiliary device is an evaporative unit.

6. A unit according to claim 3, comprised of two deep-drawn foils connectable by fusing, wherein said two foils have spaced-apart portions, with said spaced-apart portions being fused laterally and forming said air channels.

7. A unit according to claim 6, wherein said foils are made of plastic.

8. A unit according to claim 6, wherein said spaced-apart portions extend substantially horizontally and wherein a material thickness of portions of said unit having a vertical component are reducible by deep-drawing.

9. A unit according to claim 6, wherein an upper one of said two foils forms said support structure and separates said at least one suction channel and said at least one air distributing channel.

10. A unit according to claim 6, wherein said air channels comprise a pressure equalizing chamber connected to the pressure side of the blower, said pressure equalizing chamber having supports formed by projections of said two foils projecting toward and abutting at one another.

11. A unit according to claim 6, wherein said two foils are upwardly drawn within an area of the cabin vehicle where a head of a driver is located to form a substantially horizontal double wall.

12. A unit according to claim 6, wherein between an upper one of said two foils and a roof envelope of the cabin vehicle one said suction channel is provided and said upper one of said two foils is spaced from the roof envelope.

13. A unit according to claim 6, further comprising supply lines for said blower and said at least one auxiliary device, wherein said supply lines are guided through roof supporting-columns of the cabin vehicle.

14. A unit according to claim 13, wherein one of the roof-supporting columns is connected with an upper end thereof to one said air channel such that air is guided to a floor space of the cabin vehicle.

15. A unit according to claim 6, wherein a lower one of said two foils is provided with a damping material.

16. A unit according to claim 15, wherein said damping material is a soft foamed material.

17. A unit according to claim 2, wherein said support structure has means for receiving operating elements for controlling heating and air conditioning.

18. A unit according to claim 2, further comprising a filter with a housing, wherein said housing of said filter covers said suction channel and is glued to said support structure.

19. A unit according to claim 1, further comprising a support structure, wherein at least some of said air channels are arranged within said support structure, said support structure being comprised of a portion of a unishell construction and a portion comprised of two half-shells, wherein said portion of a unishell construction has a wall thickness twice as thick as the wall thickness of said portion comprised of two half-shells.

20. A unit according to claim 1, further comprising air inlets and vents, wherein said at least one of said suction channel and said air distributing channel comprised of two half-shells and manufactured by a double deep-drawing process forms a chamber delimited by said blower and at least one of said inlets and said vents.

21. A unit according to claim 1, further comprising a preset breaking point for forming a flap serving to switch between air intake and air circulation within said unit.

22. A unit according to claim 21, wherein said flap comprises a film joint to allow pivoting of said flap.

23. A unit according to claim 1, further comprising a flap with a film joint, said flap serving to switch between air intake and air circulation within said unit.

\* \* \* \* \*